(12) United States Patent
Beckman et al.

(10) Patent No.: US 10,351,262 B1
(45) Date of Patent: Jul. 16, 2019

(54) STATIC INVERSE DESYMMETRIZED PROPELLERS

(71) Applicant: Amazon Technologies, Inc., Seattle, WA (US)

(72) Inventors: Brian C. Beckman, Newcastle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 15/230,223

(22) Filed: Aug. 5, 2016

(51) Int. Cl.
| | |
|---|---|
| *B64C 39/02* | (2006.01) |
| *B64D 47/00* | (2006.01) |
| *G01C 23/00* | (2006.01) |
| *B64F 5/00* | (2017.01) |
| *G05B 19/418* | (2006.01) |

(52) U.S. Cl.
CPC .......... *B64F 5/0009* (2013.01); *B64C 39/024* (2013.01); *G05B 19/41805* (2013.01); *B64C 2201/128* (2013.01); *G05B 2219/35034* (2013.01); *G05B 2219/37337* (2013.01)

(58) Field of Classification Search
CPC ............ B64F 5/0009; G05B 19/41805; G05B 2219/35034; G05B 2219/37337; B64C 39/024; B64C 2201/128
See application file for complete search history.

(56) References Cited

U.S. PATENT DOCUMENTS

| | | | |
|---|---|---|---|
| 8,989,924 B2 | 3/2015 | Seydoux et al. | |
| 9,592,911 B2 * | 3/2017 | Liu | B64C 39/024 |
| 9,646,597 B1 * | 5/2017 | Beckman | B64C 39/024 |
| 9,731,650 B2 | 8/2017 | Gee et al. | |
| 9,889,931 B2 * | 2/2018 | Xu | B64C 39/024 |
| 10,013,900 B2 * | 7/2018 | Beckman | G09F 9/33 |
| 10,023,297 B1 * | 7/2018 | Beckman | B64C 11/003 |
| 2003/0034883 A1 | 2/2003 | Sato et al. | |
| 2006/0158329 A1 | 7/2006 | Burkley et al. | |
| 2007/0103292 A1 | 5/2007 | Burkley et al. | |
| 2010/0220552 A1 | 9/2010 | Owaki et al. | |
| 2012/0097801 A1 | 4/2012 | Barrett | |
| 2013/0056581 A1 | 3/2013 | Sparks | |
| 2013/0065681 A1 | 3/2013 | Olomskiy | |
| 2013/0328701 A1 | 12/2013 | Sato et al. | |
| 2014/0162835 A1 | 6/2014 | Gotoda et al. | |

(Continued)

OTHER PUBLICATIONS

U.S. Appl. No. 15/255,098, Non-Final Office Action, dated Mar. 12, 2018, 14 pages.

(Continued)

*Primary Examiner* — Abdelmoniem I Elamin
(74) *Attorney, Agent, or Firm* — Kilpatrick Townsend & Stockton LLP

(57) ABSTRACT

Techniques for using a sound spectrum to generate models, which identify unmanned aerial vehicle (UAV) configurations, are described herein. The models may be based on components associated with a UAV, and instructions for manufacture of a UAV may be provided. For example, a sound spectrum may be obtained by a computer system which is used to generate one or more models. The one or more models are based in part on components of a UAV and identify UAV configurations that will generate an expected sound within the identified sound spectrum. The UAV configurations identified by the models are used to instruct manufacture of a UAV.

19 Claims, 8 Drawing Sheets

(56) References Cited

U.S. PATENT DOCUMENTS

| | | |
|---|---|---|
| 2014/0180914 A1 | 6/2014 | Abhyanker |
| 2015/0000252 A1 | 1/2015 | Moore et al. |
| 2015/0056058 A1 | 2/2015 | Grissom et al. |
| 2015/0203031 A1 | 7/2015 | Arita et al. |
| 2015/0331095 A1 | 11/2015 | Sato et al. |
| 2016/0063987 A1* | 3/2016 | Xu .................. B64C 39/024 381/71.12 |
| 2016/0068267 A1* | 3/2016 | Liu .................. B64C 39/024 701/11 |
| 2016/0083073 A1 | 3/2016 | Beckman |
| 2016/0107751 A1 | 4/2016 | D'andrea et al. |
| 2016/0125746 A1 | 5/2016 | Kunzi et al. |
| 2016/0189732 A1* | 6/2016 | Hearing .................. G10L 19/00 381/56 |
| 2016/0241767 A1* | 8/2016 | Cho .................. H04N 5/23203 |
| 2016/0258758 A1 | 9/2016 | Houston et al. |
| 2017/0148328 A1 | 5/2017 | Chan et al. |
| 2017/0148467 A1* | 5/2017 | Franklin .................. G10L 25/51 |
| 2017/0174317 A1 | 6/2017 | Beckman et al. |
| 2018/0068567 A1 | 3/2018 | Gong et al. |
| 2018/0105270 A1 | 4/2018 | Xu et al. |
| 2018/0259613 A1 | 9/2018 | Hirata et al. |

OTHER PUBLICATIONS

PCT/US2017/039476, "PCT Search Report", dated Oct. 2, 2017, 13 pages.

Yoon et al., "Advanced Sound Capturing Method With Adaptive Noise Reduction System for Broadcasting Multi Copters", *2015 IEEE International Conference on Consumer Electronics (ICCE)*, *IEEE* (Jan. 9, 2015), pp. 26-29.

U.S. Appl. No. 14/975,265, filed Dec. 18, 2015, Titled: Propeller Blade Leading Edge Serrations for Improved Sound Control.

U.S. Appl. No. 15/194,258, filed Jun. 27, 2016, Titled: Drone Noise Reduction.

U.S. Appl. No. 15/194,317, filed Jun. 27, 2016, Titled: Propeller Sound Alteration for a Drone.

U.S. Appl. No. 15/255,098, filed Sep. 1, 2016, Titled: Drone Noise Reduction Via Simultaneous Propeller Modulation.

U.S. Appl. No. 15/353,637, filed Nov. 16, 2016, Titled: On-Demand Drone Noise Measurements.

U.S. Appl. No. 15/255,098, "Notice of Allowance", dated Jun. 22, 2018, 6 pages.

* cited by examiner

STATIC INVERSE DESYMMETRIZED PROPELLERS

CROSS-REFERENCES TO RELATED APPLICATIONS

This application is related to and incorporates by reference for all purposes the disclosures of U.S. patent application Ser. No. 15/194,258, filed Jun. 27, 2016, now U.S. Pat. No. 10,023,297 issued on Jul. 17, 2018, entitled "DRONE NOISE REDUCTION" U.S. patent application Ser. No. 15/255,098, filed Sep. 1, 2016, now U.S. Pat. No. 10,118,692 issued on Nov. 6, 2018, entitled "DRONE NOISE REDUCTION VIA SIMULTANEOUS PROPELLER MODULATION"; U.S. patent application Ser. No. 15/194,317, filed Jun. 27, 2016, now U.S. Pat. No. 10,023,298 issued on Jul. 17, 2018, entitled "PROPELLER SOUND ALTERATION FOR A DRONE"; and U.S. patent application Ser. No. 15/353,637, filed Nov. 16, 2016, entitled "ON-DEMAND DRONE NOISE MEASUREMENTS".

BACKGROUND

More and more users are turning to network-based resources, such as electronic marketplaces, to purchase items (e.g., goods and/or services). Typically, a user (e.g., a customer) may operate a computing device to access a network-based resource and request information about an item. The network-based resource may provide the information and information about an available delivery method. In turn, the user may purchase the item from the network-based resource and specify a delivery location. The item may be accordingly delivered to the delivery location. The network-based resource may provide an option to deliver the item to the delivery location via an unmanned aerial vehicle (UAV) thus increasing traffic and noise levels near the delivery location.

BRIEF DESCRIPTION OF THE DRAWINGS

Various embodiments in accordance with the present disclosure will be described with reference to the drawings, in which.

DETAILED DESCRIPTION

Figure 1:
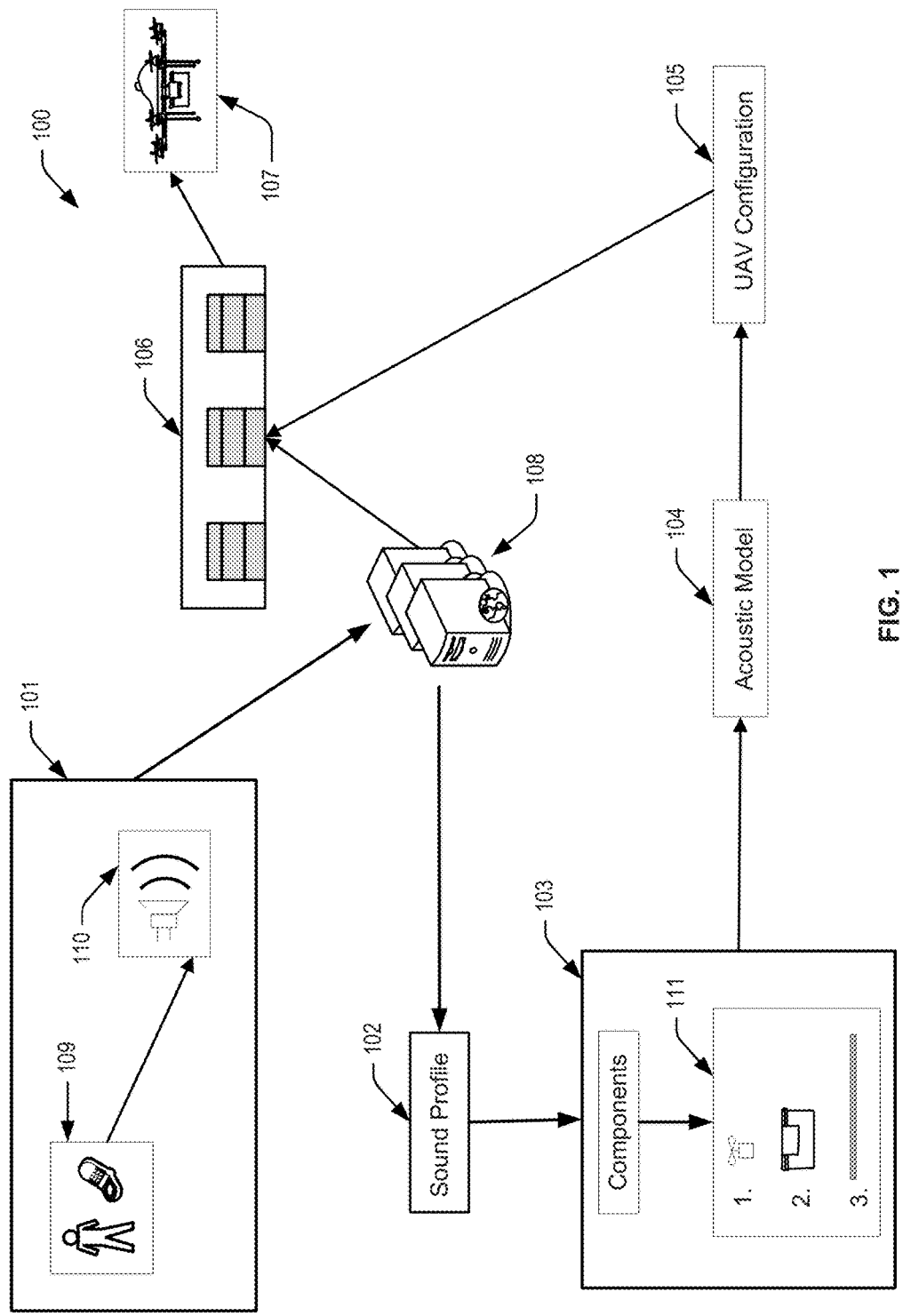
FIG. 1 illustrates an example data flow for generating an acoustic model and instructing the manufacture of a UAV, based in part on a user identified sound, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, systems and methods for generating an acoustic model and instructing the manufacture or assembly of an unmanned aerial vehicle (UAV). In particular, a UAV may be configured to generate a particular sound based on acoustic models and components used in construction of the UAV. In some embodiments, the particular sound may be provided by a user that desires the UAV to simulate in order to provide for a more pleasing or less distracting sound generated by the UAV. For example, a user may provide input that identifies a sound they find desirable and an acoustic model may be generated based in part on the identified sound and sound properties that are known for components used in manufacture or assembly of the UAV. Manufacture or assembly of a UAV, which produces the desired sound during flight, is then instructed. As used herein, manufacture of the UAV may include assembly of the UAV from UAV components.

In some embodiments, a sound profile is generated for an individual user, based on a sound spectrum identified by an individual user and the input of other users. For example, a user may identify a sound spectrum that they enjoy, find pleasing, or find less distracting (such as a particular octave scale). The user communicates this preference over a network to a computer system, such as a service provider computer that is configured to implement the systems and methods described herein. In some embodiments, a software application or agent that is configured to run on a user's associated computing device (i.e., mobile phone, tablet computer, etc.,) may communicate or authorize a preference for the sound spectrum. The software application can perform the communication of the user's preference without further input or guidance from the user in a hands off operation. Other users, near the first user, may also provide additional information to the computer system such as their desired sounds. Further, information may be obtained or gathered about a user's location such as the landing surface composition, the building density, or weather from previous interactions of a UAV with a user's location and/or other sources. The computer system may use the information to generate a sound profile for an individual user. The sound profile may be used to determine the configuration of a UAV by generating an appropriate acoustic model. The UAV configuration can be used for an individual user or for multiple users. In embodiments, a sound, or a particular sound can include a band that corresponds to a portion of a spectrum that further includes amplitude, phase, and frequency.

In some embodiments, the components used to manufacture or assemble a UAV are ranked with certain parameters to determine the sound contribution of each component to the overall UAV sound profile. Components can be given weighting factors based on the desired sound output of the UAV. The ranking information for the components of a UAV may be another data point utilized in generating an acoustic model to generate a desired sound spectrum for a UAV during flight. In some embodiments, the one or more models may utilize the interaction between and among each component of the UAV to determine a configuration for generating an expected sound. The one or more models may utilize a plurality of permutations and combinations of the components of a UAV to determine a particular configuration for generating an expected sound of the UAV during flight. In some embodiments, each configuration identified by a generated model may be associated with a weighting factor with respect to the expected generated sound of a UAV manufactured according to the configuration. In embodiments, a sound spectrum can correspond to a function of time and frequency. In various embodiments, a collection of weighting factors may be utilized that is comprised of weighting factors for each component in the assembly or configuration under consideration for the UAV.

In embodiments, multiple models can be generated for a single user depending on the desired sound output and the desired UAV components. For example, a user can provide their preferred sound and different models can be generated that use different components but all produce the desired sound. A different model for the user can be determined depending on the components available at the time. Conversely, a user can provide different preferred sounds and models can be generated to produce these different sounds using only one set of components. Additionally, models can be produced where the sound output and the components used vary. In some embodiments, propeller blades may be varied in order to achieve a desired sound identified by a user. All of the propeller blades may be the same size with their angles relative to each other being varied. Additionally, the angles of the propeller blades may be consistent with each other but their blade size may vary. The propeller blades may also vary in both size and angles. In embodiments, an acoustic model may identify a particular configuration of components for the manufacture of a UAV and particular revolutions per minute (RPMs) for associated propellers to utilize during flight to achieve the desired sound or be within a desired sound spectrum.

In embodiments, models generated by a computer system may be continuously updated with new data from multiple sources. For example, once a user has identified a preferred sound and sent that preference to a computer system, the computer system can generate a model of a UAV configuration which will produce the desired sound. The computer system can update this model continuously by receiving new information such as the users' updated sound preference, the weather, or feedback from other users. In some embodiments, acoustic models and UAV configurations may be updated based on input and/or information obtained by the UAV during flight and in certain conditions (altitude, speed, payload weight, environment, weather, etc.,). In some embodiments, a sound spectrum may be used to determine the acoustic model generated for a particular user that can vary from $1/24^{th}$ of an octave to $1/3^{rd}$ of an octave. The values in octaves described herein are an example or an approximation scheme that can be utilized to reduce the number of possibilities during model generation. In embodiments, the acoustic models may utilize data about an intended payload to determine a configuration of components for a UAV. For example, the size, weight, distribution of weight, any surrounding or utilized packaging, and other suitable factors can be utilized by the acoustic model to determine a configuration of components of a UAV that can result in an expected sound generated by the UAV during flight. The acoustic models may utilize and analyze data corresponding to the interaction of the components of the UAV with each other and with the payload as well as with environmental conditions (weather, air density, etc.,) or surroundings (valley, peaks, mountainous range, etc.,).

To illustrate, consider an example of a network-based resource, such as a web site, associated with an electronic marketplace. A user may access the web site and order cotton napkins and porcelain plates. The user may also provide input that identifies a sound or sound spectrum they desire a UAV to generate when delivering the cotton napkins and porcelain plates. A computer system may generate an acoustic model that further identifies and instructs a particular UAV configuration that will produce a matching sound to the user identified sound when in flight to deliver the items. The acoustic model generation may take into account the composition of the UAV, such as particular components utilized to manufacture or quickly assemble the UAV from available parts, as well as the items that were ordered and the location of the user. In embodiments, a UAV that adheres to the configuration identified by the acoustic model may be pre-generated or previously manufactured and identified. In embodiments, the manufacture or ad-hoc assembly of the UAV may be instructed according to the acoustic model. In either case, a UAV manufactured or assembled according to the acoustic model may then be dispatched to deliver the order.

In the interest of clarity of explanation, the embodiments may be described herein in the context of a UAV delivering a package containing an item ordered from a network-based resource. However, the embodiments are not limited as such. Instead, the embodiments may similarly apply to one or more UAVs, each or a collection thereof, delivering one/or more payloads to a user's location.

Turning to FIG. 1, an example data flow 100 for generating an acoustic model and instructing the manufacture of a UAV, based in part on a user identified sound, according to embodiments is depicted. In particular, a computer system 108 receives input 101 from a user 109 which identifies a sound 110. In embodiments, a user may provide input 101 or identify the sound 110 by interacting with a user device such as a mobile phone, a tablet computer, a laptop, a desktop computer, a wearable device, or any suitable computer device that a user can interact with to identify or provide a desired sound or sound spectrum. As described herein, an agent or application associated with the user device may provide the desired sound 110 or sound profile. In some embodiments, the computer system may generate a sound profile 102 based in part on the user input 101. In embodiments, the sound profile 102 may represent the identified sound or sound spectrum that is associated with a user. In embodiments, the computer system may identify and rank components of a UAV at 103 based in part on the sound profile 102 of the user 109. In embodiments, the computer system 108 may rank the components 111 based on sound properties or characteristics of each component. For example, based on the sound profile 102 and the identified sound 110, certain components may be ranked higher than others. A sound profile may include metrics such as loudness, roughness, sharpness, fluctuation strength, and tonal prominence. Each component 111 may be ranked according to each of the metrics individually or in combination according to their effect on the sound potential sound generated by a manufactured UAV and the identified sound 110 and sound profile 102.

In embodiments, the computer system 108 may generate an acoustic model 104 based in part on the ranked components 111. In some embodiments, the computer system may utilize one or more "blind" machine learning algorithms or analytical model of sound production to identify a particular configuration of components 103 of a UAV to manufacture the UAV such that during flight the UAV generates a sound similar to the identified sound 110 or sound spectrum of the sound profile 102. The acoustic model 104 may identify an expected UAV configuration 105 that corresponds to the sound profile 102 and identified sound 110. In embodiments, the UAV configuration 105 may be utilized by a computer system, such as 108, to instruct the manufacture of a UAV that corresponds to the configuration 105 such that during flight the UAV produces or generates an expected sound that corresponds to the sound profile 102 and/or identified sound 110. The sound generated and/or produced by the UAV may be a result of the specific components 103, 111, utilized to manufacture or assemble the UAV as well as the specific treatments of the components (i.e., propeller blade size adjustments, propeller blade treatments such as coatings, pitch and rake angles, compositions of materials utilized for components, etc.,).

In accordance with at least one embodiment, the computer system 108 may instruct a manufacturing or assembly facility 106 to manufacture or assemble the UAV 107 using the UAV configuration 105 identified by the particular acoustic model 104. The manufacturing facility 106 may manufacture or produce the UAV 107 utilizing the specific components 103, 111 according to the UAV configuration 105 that was identified by the acoustic model 104. In embodiments, the UAV configuration 105 may identify not only the specific components, treatments, etc., but also the placement and specific configuration of components with respect to each other. For example, an exemplary UAV configuration may identify propeller blade and associated motor placement in one configuration with respect to the frame of the UAV as opposed to another UAV configuration may instruct the same components be configured in a second configuration with respect to the frame. Example components of a UAV, such as the UAV 107, configured to deliver a package to a location and produce a desired sound are further illustrated in FIG. 2. As described herein, the UAV 107 may be configured to utilize different configurations of sets of propellers of different sizes to deliver the item to the delivery location and generate an expected sound when utilized simultaneously during flight.

Figure 2:
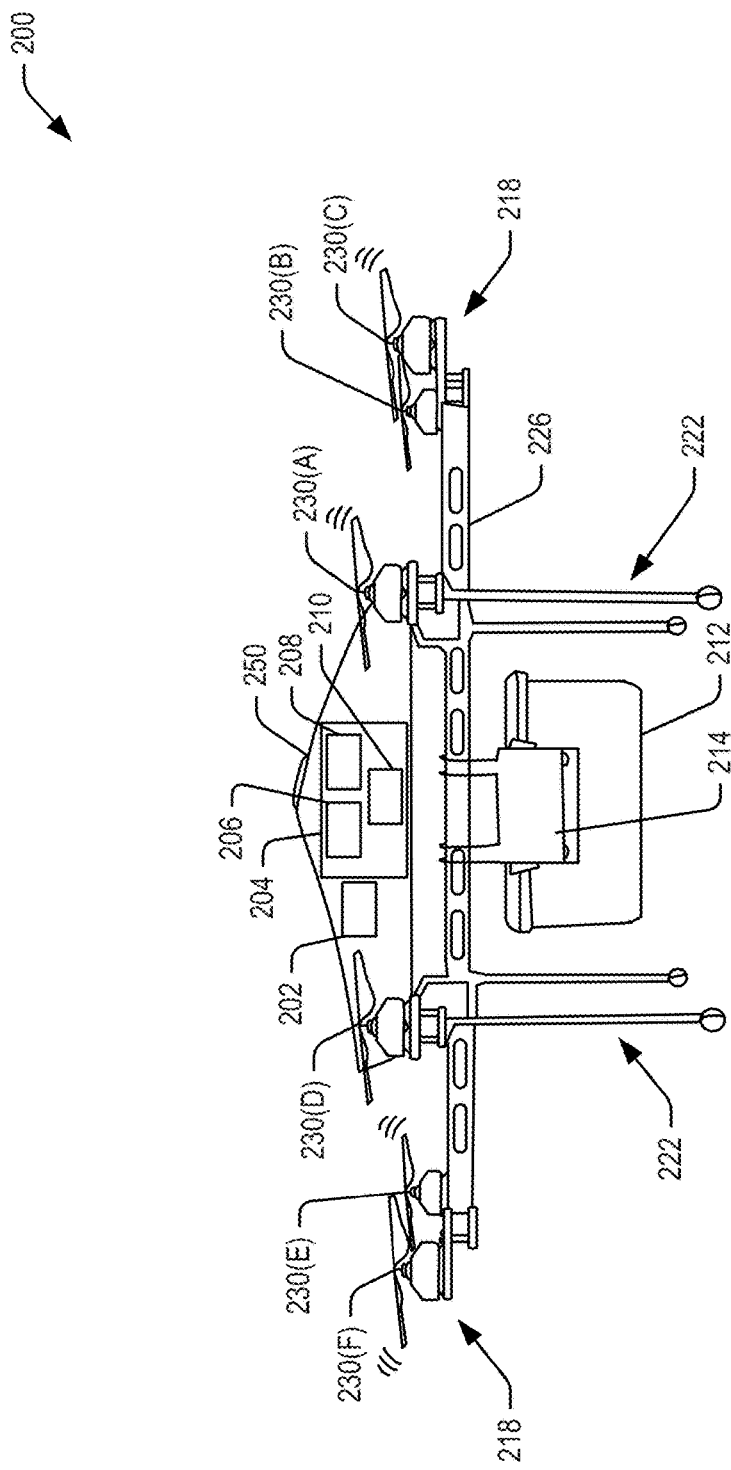
FIG. 2 illustrates an example unmanned aerial vehicle (UAV) configured to deliver an item, according to embodiments.

FIG. 2 illustrates an example unmanned aerial vehicle configured to deliver an item and generate a sound according to the configuration of the UAV as determined by a generated acoustic model, according to embodiments. In FIG. 2, an example UAV 200 configured to deliver an item is illustrated. The UAV 200 may be designed in accordance with commercial aviation standards and may include multiple redundancies to ensure reliability. In particular, the UAV 200 may include a plurality of systems or subsystems operating under the control of, or at least partly under the control of, a management component 202. The management component 202 may be configured to mechanically and/or electronically manage and/or control various operations of other components of the UAV 200. For example, the management component 202 may include various sensing, activating, and monitoring mechanisms to manage and control the various operations. For instance, the management component 202 may include or interface with an onboard computing system 204 hosting a management module for autonomously or semi-autonomously controlling and managing various operations of the UAV 200 and, in some examples, for enabling remote control by a pilot. The various operations may also include managing other components of the UAV 200, such as a propulsion system 218 to facilitate flights, a payload holding mechanism 212 to facilitate holding a payload (e.g., a package), and/or a payload releasing mechanism 214 to facilitate release and delivery of the payload. Portions of the management component 202, including mechanical and/or electronic control mechanisms may be housed under the top cover 250 or distributed within other components such as the payload holding mechanism 212 and the payload releasing mechanism 214. In a further example, components remote from the UAV 200 may be deployed and may be in communication with the management component 202 to direct some or all of the operations of the management component 202. These remote components may also be referred to as a management component. In an example, the management component 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), and radio-frequency identification (RFID) capability (not shown).

The UAV 200 may also include the onboard computing system 204. In an example, the computing system 204 may be integrated with the management component 202. In another example, the computing system 204 may be separate from but may interface with the management component 202. The computing system 204 may be configured to provide an electronic control of various operations of the UAV 200, including the ones provided by the management module. In an example, the computing system 204 may also process sensed data by one or more other components of the UAV, such as the management component 200, to generate data associated with a delivery surface. In a further example, the computing system 204 may also electronically control components of the payload holding mechanism 212 and/or the payload releasing mechanism 214. In another example, the computing system 204 may also electronically control components of the UAV 200 such as a plurality of propulsion devices, a few of which, 230(A)-230(F) are included in FIG. 2. As illustrated in FIG. 2, the computing system 204 may be housed within the top cover 250 and may include a number of components, such as a computer 206, a storage device 208, and an interface 210. The computer 206 may host the management module configured to provide management operations of the flight and/or other portions of a mission of the UAV 200. For example, the data management module may generate the data associated with the sound generated by or around the UAV 200, determine an appropriate delivery surface, determine a distance by which to lower a payload, a speed of lowering the payload, direct the propulsion system to position the UAV 200 according to this data, activate a release of a package from the payload holding mechanism 212, activate a release of a cable, and/or activate other functions of the mission. In embodiments, the data management module may obtain measured sounds associated with operational and/or environmental data gathered during flight of the UAV 200. Such information or data may include, but is not limited to, extrinsic information or data, e.g., information or data not directly relating to the UAV 200, or intrinsic information or data, e.g., information or data relating to the UAV 200 itself. For example, extrinsic information or data may include, but is not limited to, environmental conditions (e.g., temperature, pressure, humidity, wind speed, and wind direction), times of day or days of a week, month or year when a UAV is operating, measures of cloud coverage, sunshine, surface conditions or textures (e.g., whether surfaces are wet, dry, covered with sand or snow or have any other texture) within a given environment, a phase of the moon, ocean tides, the direction of the earth's magnetic field, a pollution level in the air, a particulates count, or any other factors within the given environment. Intrinsic information or data may include, but is not limited to, operational characteristics (e.g., dynamic attributes such as altitudes, courses, speeds, rates of climb or descent, turn rates, or accelerations; or physical attribute such as dimensions of structures or frames, numbers of propellers or motors, operating speeds of such motors), tracking positions (e.g., latitudes and/or longitudes) of the UAVs, or status of a package for deliver (complete or in-transit). The storage device 208 may represent one or more storage media, such as a volatile or non-volatile semiconductor, magnetic, or optical storage media. In an example, the storage device 208 may be configured to store any operational data of the UAV 200, extrinsic or intrinsic sound data obtained by sensors associated with the UAV 200 regarding sound generated by or around the UAV 200, generated or received data associated with the delivery surface, and/or received data associated with a delivery location. The data may include the distance by which the payload may be lowered and the lowering speed. In addition, the storage device 208 may store a set of rules associated with lowering and releasing the payload. This set of rules may specify parameters to determine, where, when, and/or how to deliver the payload such that a likelihood of damaging the payload (or content thereof) and/or interference with the UAV 200 may be reduced. The set of rules may also specify parameters to determine appropriate sound levels regarding metrics included in a sound profile (loudness, fluctuation strength, etc.,). The computer 206 (e.g., the management module) may monitor and/or determine some or all of the parameters and accordingly generate the distance and/or the speed for delivery and determine the appropriate sets of particular propellers of a certain size with corresponding rotational speed to utilize to reduce and/or alter sound generated by the UAV 200. The appropriate sets of propellers of a certain size to utilize during flight, hover, landing, or take off of the UAV 200 may be based in part on the UAV configuration that is derived from an acoustic model as described herein. For example, simultaneous use of all the propellers of a UAV at different RPMs may be utilized to generate an expected sound according to a sound profile or the activation of one or more of the total set of propellers of the same RPMs may be utilized to generate an expected sound according to the sound profile. The interface 210 may represent an interface for exchanging data as part of managing and/or controlling some of the operations of the UAV 210. In an example, the interface 210 may be configured to facilitate data exchanges with the management component 202, other components of the UAV 200, and/or other components remote from the UAV 200. As such, the interface 210 may include high speed interfaces, wired and/or wireless, serial and/or parallel, to enable fast upload and download of data to and from the computing system 204.

As shown in FIG. 2, the UAV 200 may also include the payload holding mechanism 212. The payload holding mechanism 212 may be configured to hold or retain a payload. In some examples, the payload holding mechanism 212 may hold or retain the payload using friction, vacuum suction, opposing arms, magnets, holding, and/or other retaining mechanisms. As illustrated in FIG. 2, the payload holding mechanism 212 may include a compartment configured to contain the payload. In another example, the payload holding mechanism 212 may include two opposing arms configured to apply friction to the payload. The management component 202 may be configured to control at least a portion of the payload holding mechanism 212. For example, the management component 202 may electronically and/or mechanically activate the payload holding mechanism 212 to hold and/or release the payload. In an example, the payload may be released from the payload holding mechanism 212 by opening the compartment, pushing the payload, moving one or both of the opposing arms, and/or stopping an application of friction, vacuum suction, and/or magnetic force.

The UAV 200 may also include the payload releasing mechanism 214. In an example, the payload releasing mechanism 214 may be integrated with the payload holding mechanism 212. In another example, the payload releasing mechanism may be separate from the payload holding mechanism 212. In both examples, the payload releasing mechanism 214 may be configured to lower, using a cable, a payload released from the payload holding mechanism 214 and to release the cable once the payload is lowered by a distance.

As such, the payload releasing mechanism 214 may include a lowering mechanism and a release mechanism. For example, the lowering mechanism may include a cable and/or an electronic or mechanical control configured to lower the cable at a controlled speed. For example, this control may include a winch, a spool, a ratchet, and/or a clamp. The cable may couple the payload with the UAV 200. For example, one end of the cable may be connected, attached, or integral to the payload. Another end of the cable may be coupled to one or more components of the payload releasing mechanism 214, the payload holding mechanism 212, the frame of the UAV 200, and/or other component(s) of the UAV 200. For example, the cable may be coiled around the winch or spool or may be stowed or coiled inside the compartment (if one is used as part of the payload holding mechanism 212). The cable may have a configuration selected based on the mission of the UAV 200, the mass of the payload, and/or an expected environment associated with the delivery location (e.g., the potential interference).

In an example, the release mechanism may be integrated with the lowering mechanism. In another example, the release mechanism may be separate from the lowering mechanism. In both examples, the release mechanism may be configured to release the cable when the payload may have been lowered by a certain distance. Releasing the cable may include severing the cable, weakening the cable, and/or decoupling the cable from the UAV 200 (e.g. from the payload releasing mechanism 214) without severing or weakening the cable.

To sever the cable, the release mechanism may include a sharp surface, such as a blade to, for example, cut the cable when applied thereto. To weaken the cable, the release mechanism may include a sharp head, edge, and/or point, such as a hole puncher, or a friction surface to cause a damage to the integrity of the structure of the cable. Other release mechanisms may also be used to sever or weaken the cable. An example may include a mechanism configured to apply a thermoelectric effect to the cable. For instance, a contact surface, such as one using an electrical conductor, may be configured to release heat upon application of a voltage. The contact surface may come in contact with the cable or may be integrated within different sections of the cable. Upon application of the voltage, the contact surface may sever or weaken the cable by applying heat to the cable. To decouple the cable from the UAV 200, the cable may be in the first place insecurely coupled to the UAV 200 such that, upon an unwinding of the cable, the cable may become detached from the UAV 200. For example, the cable may be coiled around the winch or spool without having any of the cable ends attached to the winch or spool or to another component of the UAV 200. In another example, the cable may be coupled to a component of the UAV 200 through a weak link such that upon a tension generated based on the mass of the payload, the link may be broken to free the cable from the UAV 200.

The release mechanism may be electronically or mechanically controlled. This control may be effected based on, for example, the distance by which the payload may have been lowered and/or based on an amount of a tension of the cable, an increase in the amount, a decrease in the amount, or a sudden or fast change in the amount. Various configurations may be used to measure the distance, the amount of tension, and the change in the amount. For example, the distance may be determined from the number of rotations of a winch or spool if one is used or based on a distance or cable length sensor. The amount of the tension and the change in the amount may be determined based on spring-based or electronic-based sensors.

Further, the release mechanism may be electronically activated based on a signal generated in response to detecting that the distance may have been traveled and/or the amount or change in the amount of tension. In another example, the release mechanism may be activated based on a mechanical configuration. For example, as the cable may be lowered, a ratchet may load a spring that may be coupled to release mechanism. Upon the load exceeding a threshold, the spring may be released, thereby activating the release mechanism. In another example, a tension of the cable may be used to hold the release mechanism away from the cable. As soon as the tension changes (e.g., the cable becomes loose indicating that the payload may be resting on the ground), the release mechanism may be activated to sever or weaken the cable.

Further, the UAV 200 may include a propulsion system 218. In some examples, the propulsion system 218 may include rotary blades or otherwise be a propeller-based system. As illustrated in FIG. 2, the propulsion system 218 may include a plurality of propulsion devices, a few of which, 230(A)-230(F), are shown in this view. Each propeller device may include one propeller, a motor, wiring, a balance system, a control mechanism, and other features to enable flight. In some examples, the propulsion system 218 may operate at least partially under the control of the management component 202. In some examples, the propulsion system 218 may be configured to adjust itself without receiving instructions from the management component 202. Thus, the propulsion system 218 may operate semi-autonomously or autonomously.

The UAV 200 may also include landing structure 222. The landing structure 222 may be adequately rigid to support the UAV 200 and the payload. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226. In some examples, the frame 226 may attach or be associated with one or more fixed wings.

Hence, a UAV, similar to the UAV 200, may be deployed on a mission to, for example, deliver a payload. The UAV may autonomously or semi-autonomously complete or perform a portion of the mission. For example, coordinates of a delivery location may be provided to the UAV. The UAV may hold the payload in a payload holding mechanism and fly to the delivery location. Upon arrival to the location, the UAV may release the payload from the payload holding mechanism.

Figure 3:
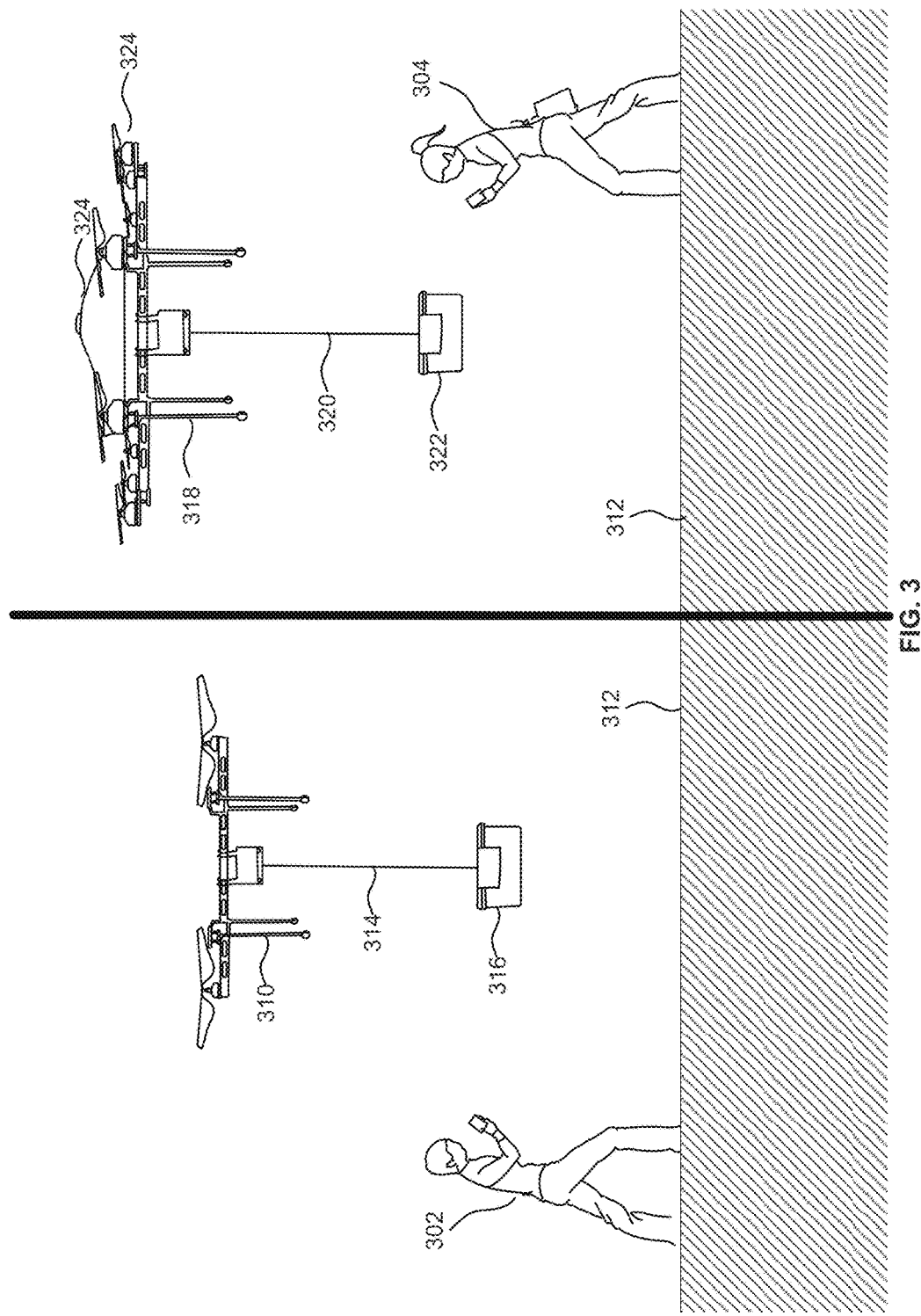
FIG. 3 illustrates examples of UAVs manufactured to produce a particular sound based on user input and acoustic model, according to embodiments.

FIG. 3 illustrates two example UAV configurations for producing a desired sound based on individual user input, according to embodiments. FIG. 3 illustrates a UAV 310 (referring to the left hand side illustration) on approach to a delivery location 312 utilizing a configuration that produces a sound which was identified by a user 302. As illustrated in FIG. 3, the configuration of the UAV 310 is made up of only two large propellers with few additional components. As depicted in FIG. 3, the particular configuration (two large propellers) may allow the UAV 310 to produce the sound desired by the user 302 while delivering the payload 316 using the delivery system 314. In embodiments, an acoustic model may be generated utilizing the sound identified by the user 302 to generate a UAV configuration that is used to manufacture the UAV 310. In some embodiments, the configuration of the UAV 310 may generate a sound or sound spectrum that is similar to the sound identified by the user 302 during flight. In some embodiments, a management module of the UAV 310 may be configured to transition between sets of propellers or modulate between the sets of propellers to generate an expected sound as calculated by the acoustic model. In some embodiments, the modulation of propellers may indicate varying RPMs utilized by the propellers to generate an expected sound. The modulation of the RPMs of the propellers blades of UAV 310 may be based in part on a current flight mode of the UAV 310. For example, a first modulation to generate the expected sound may be utilized when the UAV 310 is delivering the payload 316 as opposed to a second modulation to generate the expected sound during transit or after delivery of payload 316.

As described herein, the management module of the UAV 310 or a service provider computer in communication with UAV 310 may utilize extrinsic and intrinsic information to update or alter the sound generated by the UAV by adjusting the use of, transition between, or modulation of components of UAV 310 during flight. FIG. 3 further illustrates a UAV 318 (referring to the right hand side illustration) on approach to a delivery location 312 utilizing a configuration that produces a sound that was provided by a user 304. As depicted in FIG. 3, the configuration of the UAV 318 is made up of several small propellers and includes additional support and navigation components 324. This configuration would allow the UAV to produce the sound desired by the user 304 while delivering the payload 322 using the delivery system 320. In embodiments, a computer system (such as a service provider computer that implements systems and methods described herein) may generate an acoustic model utilizing the components (several small propellers and additional support and navigation components 324) that identify a configuration of said components that when manufactured into a UAV (such as UAV 318) generate an expected sound within a sound spectrum during flight. The acoustic model may utilize a certain number of components, according to a ranking operation of their effect on generating the expected sound or desired sound from a user to determine the UAV configuration required to generate said sound. In some embodiments, a service provider computer may include one or more policies for identifying a minimum number of components and/or the inclusion of particular components for certain UAVs delivering certain payloads or to certain locations.

Figure 4:
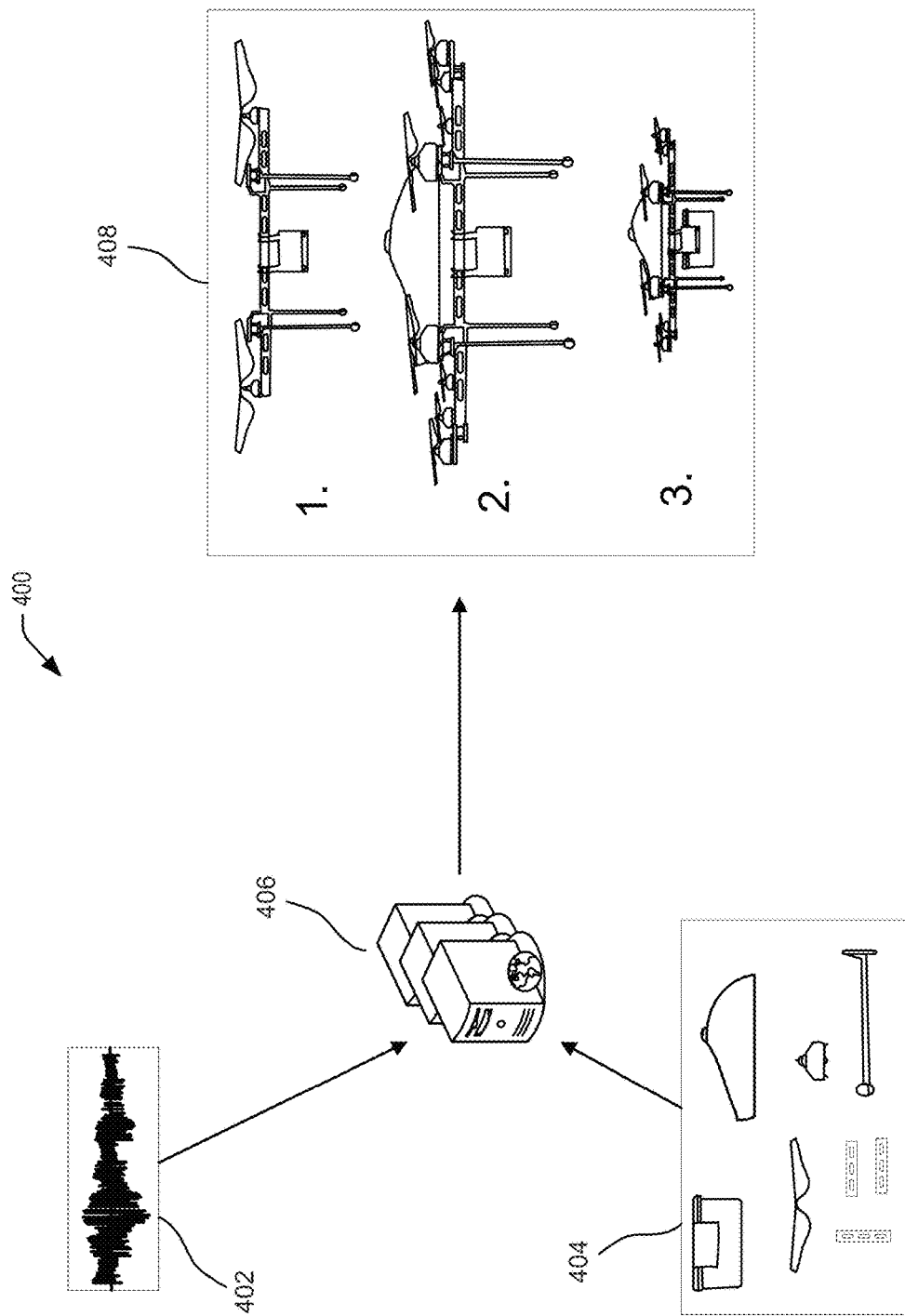
FIG. 4 illustrates a sound spectrum and components for a UAV being used to generate models of UAV configurations, according to embodiments.

FIG. 4 illustrates an example data flow 400 for generating, by a computer system 406, one or more models identifying a UAV configuration 408 based in part on one or more components associated with a UAV 404 and a sound spectrum 402. For example, the computer system obtains a sound spectrum 402 that contains one or more specific sounds or sound ranges such as a spectrum of sounds. In embodiments, the computer system 406 may obtain information regarding sound characteristics, attributes, or details generated by one or more components 404 that are associated with a UAV. In embodiments, a portion of the one or more components 404 may be available or utilized. In some embodiments, the computer system 406 may generate one or more models 408 based in part on the identified components 404 and the obtained sound spectrum 402. The one or more models 408 may identify and/or determine a particular configuration for a UAV including components, configuration of components with respect to one another (i.e., propeller motor to UAV frame), and modulation and/or transition between components (i.e., simultaneous use of all propellers at a certain RPM or utilizing a portion of available propellers at a given time).

In embodiments, the models 408 generated by the computer system 408 may include different components based on identified criteria. For example, if a lightweight UAV with minimum components is desired then 408(1) is a configuration that may meet the desired criteria while still generating a sound within sound spectrum 402 during flight. However, if stability is the most important criteria than 408(2) may be utilized to fly an item to a user while still generating a sound within sound spectrum 402. In some embodiments, the models 408 generated by computer system 406 may be utilized to further generate or provide instructions to a manufacturing facility to manufacture one or more UAVs with the components 404 identified by the models 408. In embodiments, the UAVs 408 may be pre-generated or pre-manufactured according to one or more sound spectrums 402 that are obtained by computer system 406 or provided by a user of the delivery service. In some embodiments, a dynamic model generation and UAV manufacture may occur upon the computer system obtaining a sound spectrum (like 402). The computer system 406 may dynamically generate and update the models 408 based on updated input provided by an entity, from a user, or based on input provided by the UAVs sensors during flight. Adjustments to the models 408 can be made by computer system 406 resulting in utilizing new components 404 or configurations of components 404 to manufacture a UAV that will generate a sound corresponding to a desired sound spectrum such as sound spectrum 402.

Figure 5:
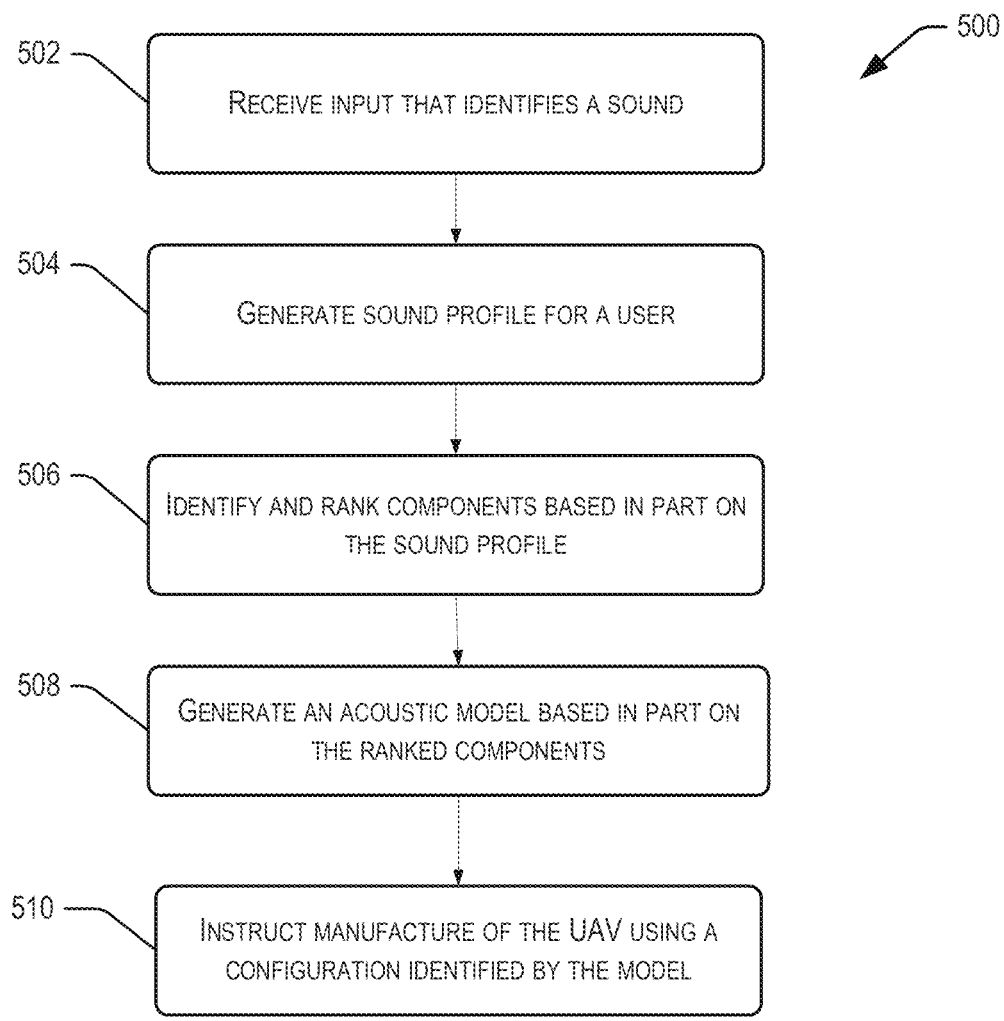
FIG. 5 illustrates an example flow diagram for generating an acoustic model and instructing the manufacture of a UAV, according to embodiments.
Figure 6:
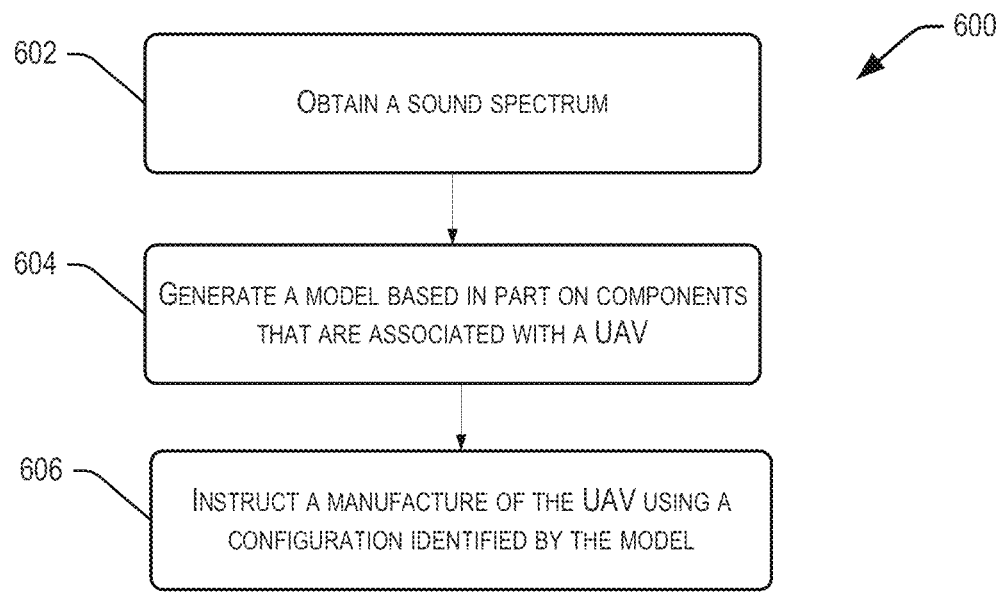
FIG. 6 illustrates an example flow diagram for generating an acoustic model and instructing the manufacture of a UAV, according to embodiments.

Turning to FIGS. 5 and 6, the figures FIGS. 5 and 6 illustrate example flows 500 and 600 for generating an acoustic model and instructing the manufacture of a UAV, according to embodiments. While the operations are illustrated in a particular order, it should be understood that no particular order is necessary and that one or more operations may be omitted, skipped, and/or reordered.

The example flow 500 of FIG. 5 may start at operation 502, where an input that identifies a sound may be received. For example, a user may identify a sound that they prefer, find pleasurable, or that they would like a UAV to emit upon delivering an item to their location. The user may communicate their preference using a computing device or accessing a network-based resource such as a web portal, web page, or user interface provided by a service provide computer. At operation 504, a sound profile for the user might be generated. The sound profile may be based at least in part on the sound preference that the user identified. In some embodiments, the sound profile may be based on aggregate input provided by one or more users. For example, a first user could identify a sound preference and a landing surface. A second user could identify a similar sound preference and similar landing surface. A sound profile could be generated for each user. The second user could provide feedback that the landing surface changed the sound the UAV produced. The feedback from the second user could be used as input to alter the sound profile for the first user.

At operation 506, one or more components are ranked based at least in part on the sound profile of the user. In some embodiments, the one or more components are given different weighting values based on their contribution to the sound profile of the UAV. In some embodiments, the components include multiple propellers. In embodiments, the components, such as propellers may be ranked according to their individual properties. For example, the propellers can be the same size with varied pitches, varied sizes with the same pitch, or the propellers can also be varied sizes and varied pitches.

At operation 508, the computer system may generate one or more acoustic models based, at least in part, on the ranked components. These models may be continuously updated with new data provided by multiple users or from UAV flights. For example, a UAV may make a delivery to a user and that user provides feedback about the sound the UAV made. Based on the user feedback the models can be updated to alter the components and/or configuration of the UAV thus altering the subsequent sound generated by the UAV. In some embodiments, the one or more models show different UAV configurations that all produce the same sound. Alternatively, the one or more models can use the same set of components to create configurations that produce different sounds by providing instructions to modulate and/or transition components. For example, simultaneous use of all available propellers at a certain RPM or utilizing a portion of propellers at different RPMs, or any suitable combination thereof.

At operation 510, the computer system may instruct manufacture of the UAV using a configuration identified by the one or more models. For example, a configuration that produces the correct sound and contains the correct components could be identified. The computer may then instruct the manufacture of the UAV using the configuration identified. Once the UAV is manufactured, it can be used to make deliveries to a user thereby generating a sound that matches with the sound profile. In some embodiments, a single UAV may be tied to a single user so that every user has their own dedicated UAV.

The example flow 600 of FIG. 6 may start at operation 602, where a computer system may obtain a sound spectrum. For example, the sound spectrum could contain one or more sounds that the computer system may use for construction of a UAV. In some embodiments, the sound spectrum may identify a sound range that is within one-third of an octave or one-twenty-fourth of an octave of an identified sound.

Other statistical variations from an identified sound within a sound spectrum may be utilized in the current disclosure. At operation 604, the computer system may generate one or more models based in part on components that are associated with a UAV. For example, the components may include one or more of the airframe structure, trusses, cross-braces, payloads, joint isolator, fastener, mounts, and motor mounts. At operation 606, the computer system may instruct the manufacture of a UAV using a configuration identified by the one or more models. For example, the computer system may instruct manufacture of any or all UAV configurations that will produce a sound during flight that is within the desired sound spectrum.

Figure 7:
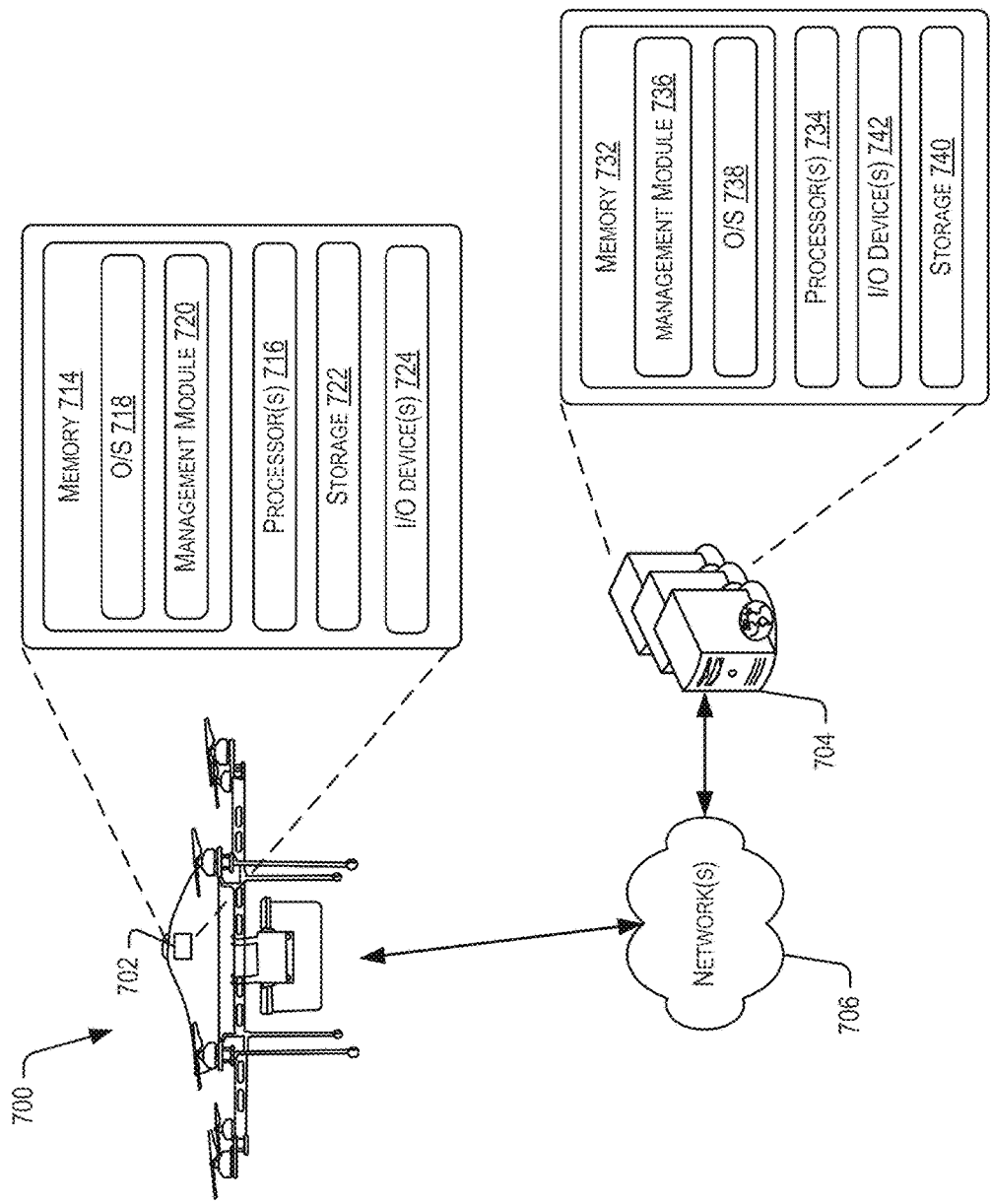
FIG. 7 illustrates an example computing for generating an acoustic model and instructing the manufacture of a UAV.

Turning to FIG. 7, a computing environment for implementing some of the above-described features within the context of generating an acoustic model and instructing the manufacture of a UAV is illustrated. The architecture may include a UAV 700, a server 704, and a network 706. Generally, the architecture may be implemented as part of an electronic marketplace offering items. For example, the server 704 may be in communication with the UAV 700 to facilitate a delivery of an item ordered from the electronic marketplace. This communication may occur over the network 706. The network 706 may include any one or a combination of many different types of networks, such as wireless networks, cable networks, cellular networks, radio networks, the Internet, and other private and/or public networks.

Turning now to the details of the server 704, the server 704 may include one or more service provider computers, such as servers and other suitable computing devices, configured to offer various data services to users. The server 704 may be configured to host a web site (or combination of web sites) accessible to customers. The web site may be accessible via a web browser and may enable a customer to place an order for an item.

In embodiments, the server 704 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the server 704 may include one or more servers, perhaps arranged in a cluster, or as individual servers not associated with one another.

In one illustrative configuration, the server 704 may include at least one memory 732 and one or more processing units (or processor(s)) 734. The processor(s) 734 may be implemented as appropriate in hardware, computer-executable instructions, software, firmware, or combinations thereof. Computer-executable instruction, software, or firmware implementations of the processor(s) 734 may include computer-executable or machine-executable instructions written in any suitable programming language to perform the various functions described. The memory 732 may include more than one memory and may be distributed throughout a plurality of a network of servers. The memory 732 may store program instructions (e.g., management module 736) that are loadable and executable on the processor(s) 734, as well as data generated during the execution of these programs. Depending on the configuration and type of memory, the memory 732 may be volatile (such as random access memory (RAM)) and/or non-volatile (such as read-only memory (ROM), flash memory, or other memory).

The server 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 732 may include multiple different types of memory, such as static random access memory (SRAM), dynamic random access memory (DRAM), or ROM.

Turning to the contents of the memory 732 in more detail, the memory 732 may include an operating system 738 and one or more application programs, modules or services for implementing the features disclosed herein including at least a management module 736. The management module 736, in some examples, may support, direct, manage, and/or control operations of some or all of the components of the UAV 700. For instance, the management module 736 may obtain data associated with a sound a user has identified. Such data may be used by the management module 736 to generate one or more models based in part on the user identified sound. Furthermore, the management module 736 may be used to instruct manufacture of a UAV 700 based on configurations identified by the one or more models. Further, the management module 736 may receive data from the UAV 700 during the deployment and/or execution of the delivery mission. The management module 736 may process that data and apply, as applicable, the data to the one or more models.

In some examples, the server 704 may also include additional storage 740, which may include removable storage and/or non-removable storage. The additional storage 740 may include, but is not limited to, magnetic storage, optical disks, and/or tape storage. The disk drives and their associated computer-readable media may provide non-volatile storage of computer-readable instructions, data structures, program modules, and other data for the computing devices.

The memory 732 and the additional storage 740, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors). The modules of the server 704 may include one or more components. The server 704 may also include I/O device(s) and/or ports 742, such as for enabling connection with a keyboard, a mouse, a pen, a voice input device, a touch input device, a display, speakers, a printer, or other I/O device.

Turning now to the details of the UAV 700, the UAV 700 may include some or all of the components of the UAV 200 described in connection with FIG. 2. In an illustrative embodiment, the UAV 700 may include a management component implemented, in part or in full, by computing system 702 similar to the computing system 204 of FIG. 2. The computing system 702 may include at least one memory 714 and one or more processing units (or processor(s)) 716. The processor(s) 716 may be implemented as appropriate in hardware, computer-executable instructions, software, firmware, or combinations thereof. Computer-executable instruction, software, or firmware implementations of the processor(s) 716 may include computer-executable or machine-executable instructions written in any suitable programming language to perform the various functions described. The memory 714 may include more than one memory and may be distributed throughout the computing system 702. The memory 714 may store program instructions (e.g., a management module 720) that are loadable and executable on the processor(s) 716, as well as data generated during the execution of these programs. Depending on the configuration and type of memory, the memory 714 may be volatile (such as random access memory (RAM)) and/or non-volatile (such as read-only memory (ROM), flash memory, or other memory).

The computing system 702 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 714 may include multiple different types of memory, such as static random access memory (SRAM), dynamic random access memory (DRAM), or ROM.

In some examples, the computing system 702 may also include additional storage 722, which may include removable storage and/or non-removable storage. The additional storage 722 may include, but is not limited to, magnetic storage, optical disks, and/or tape storage. The disk drives and their associated computer-readable media may provide non-volatile storage of computer-readable instructions, data structures, program modules, and other data for the computing devices.

The memory 714 and the additional storage 722, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. The modules of the computing system 702 may include one or more components.

Turning to the contents of the memory 714 in more detail, the memory 714 may include an operating system 718 and one or more application programs, modules or services for implementing the features disclosed herein including at least a management module 720. The management module 720 may be configured to provide flight operation management functions and/or to manage operations of different components to deliver an item at a delivery location. In an example, the management module 720 may operate autonomously or independently of the management module 736 of the server 704. In another example, the management module 720 may operate semi-autonomously or be fully controlled by the management module 736.

The computing system 702 may also include I/O device(s) 726 (e.g., interfaces, ports) such as for enabling connection with the server 704. The I/O device(s) 726 may also enable communication with the other components and systems of the UAV 700 (e.g., a propulsion system, and a payload holding system, a payload releasing system, a propeller transition system).

Figure 8:
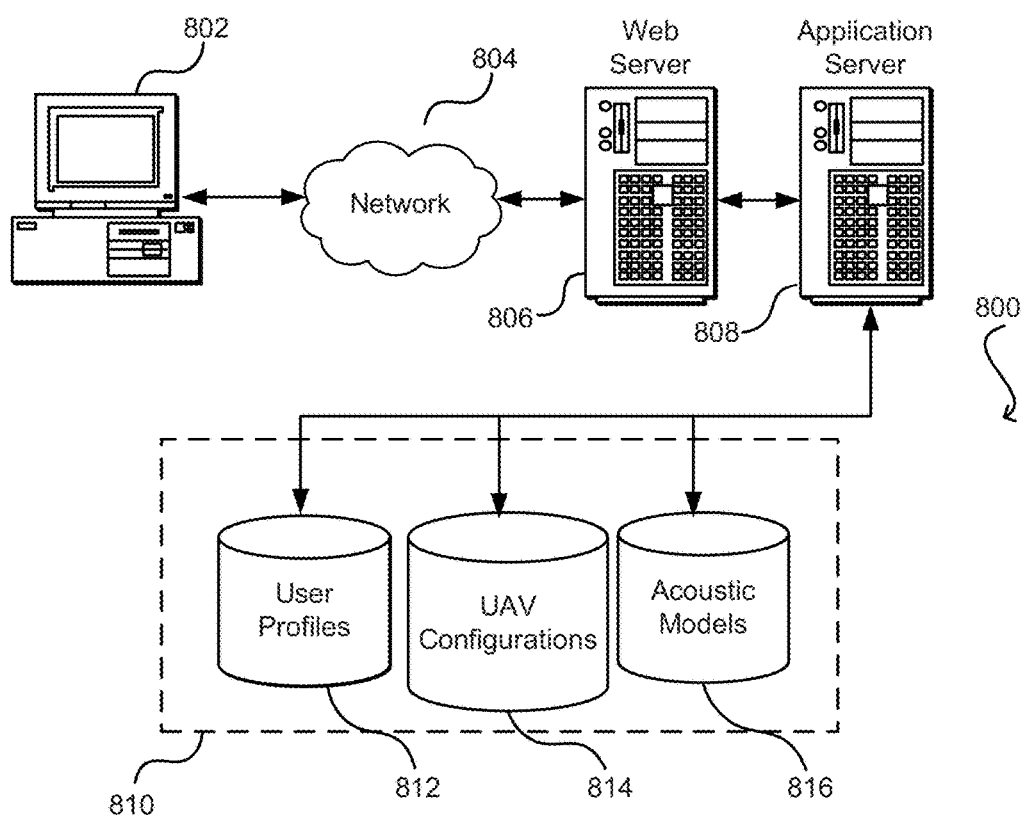
FIG. 8 illustrates an example environment for generating an acoustic model and instructing the manufacture of a UAV.

FIG. 8 illustrates an example environment for generating an acoustic model and instructing the manufacture of a UAV. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the UAV (via a client device) or to the UAV itself. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and/or UAV, handling a majority of the data access and logic for an application. The application server provides access control services in cooperation with the data store and is able to generate content such as text, graphics, audio and/or video to be transferred to the user, which may be served to the user by the Web server 806 in the form of HyperText Markup Language ("HTML"), Extensible Markup Language ("XML"), another appropriate structured language in this example, or via an application and graphical user interface. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing information which can be used by modules described herein, such as user profiles 812, UAV configurations 814, and/or acoustic models 816. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system, input that identifies a sound spectrum, the input identified by a user, the sound spectrum comprising at least one of frequency, amplitude, or phase;
generating, by the computer system, a sound profile for the user based in part on the input, the sound profile identifying at least one of a loudness, roughness, sharpness, fluctuation strength, or tonal prominence associated with the sound of the input;
identifying, by the computer system, components of an unmanned aerial vehicle (UAV) for determining one or more acoustic models of the UAV based in part on the sound profile;
ranking, by the computer system, the components based in part on the sound profile;
generating, by the computer system, a particular acoustic model based in part on the ranked components that are associated with the UAV;
identifying, by the computer system, the particular acoustic model of an expected UAV configuration that corresponds to the sound profile; and
instructing, by the computer system, manufacture of the UAV using the configuration identified by the particular acoustic model.

2. The computer-implemented method of claim 1, wherein the components include one or more of the airframe structure, trusses, cross-braces, payloads, joint isolator, fastener, general mounts, and motor mounts.

3. The computer-implemented method of claim 1, wherein the ranking of components is further based in part on a weighting system.

4. The computer-implemented method of claim 3, wherein the weighting system is based on the sound contributed by a single component of the components with respect to the sound profile.

5. A computer-implemented method, comprising:
obtaining, by a computer system, a sound spectrum comprising at least one of frequency, amplitude, or phase;
generating, by the computer system, one or more models based in part on one or more components that are associated with an unmanned aerial vehicle (UAV), a particular model of the one or more models identifying a particular UAV configuration that will generate an expected sound within a range of the sound spectrum, the expected sound associated with a sound profile that identifies at least one of a loudness, roughness, sharpness, fluctuation strength, or tonal prominence associated with the expected sound; and
instructing, by the computer system, manufacture of the UAV using the particular configuration identified by the model.

6. The computer-implemented method of claim 5, wherein the range of the sound spectrum is specified in one-thirds or one-twenty-fourths of an octave.

7. The computer-implemented method of claim 5, further comprising updating, by the computer system, the one or more models based on input provided by a user.

8. The computer-implemented method of claim 7, wherein the configuration of the UAV includes a particular configuration for one or more propellers of the UAV.

9. The computer-implemented method of claim 8, wherein the one or more propellers have different treatments that affect the generated sound by the UAV.

10. The computer-implemented method of claim 5, wherein generating the one or more models is further based in part on input provided by one or more sensors associated with the UAV, the input obtained by the one or more sensors during flight of the UAV.

11. The computer-implemented method of claim 10, wherein the input obtained by the one or more sensors include intrinsic data obtained about the UAV and extrinsic data about an environment with a certain distance around the UAV.

12. The computer-implemented method of claim 5, wherein the UAV configuration is further based at least in part on a band within the sound spectrum.

13. A computer-implemented method, comprising:
  obtaining, by a computer system, a sound spectrum comprising at least one of frequency, amplitude, or phase;
  identifying, by the computer system, components of an unmanned aerial vehicle (UAV) for determining one or more acoustic models of the UAV based in part on the sound spectrum; and
  generating, by the computer system, a configuration of the components for the UAV based in part on an acoustic model of the one or more acoustic models, the configuration enabling the UAV to generate a sound corresponding to the sound spectrum, the sound associated with a sound profile that identifies at least one of a loudness, roughness, sharpness, fluctuation strength, or tonal prominence associated with the sound.

14. The computer-implemented method of claim 13, further comprising instructing, by the computer system, assembly of the UAV using the configuration.

15. The computer-implemented method of claim 13, wherein the sound spectrum is associated with a target sound spectrum that is obtained based in part on input provided by one or more users within a geographic distance of a delivery location.

16. The computer-implemented method of claim 13, wherein the configuration of the components for the UAV includes a particular configuration of a portion of the components with respect to other components of the UAV.

17. The computer-implemented method of claim 13, wherein the one or more acoustic models is based in part on a particular payload associated with the UAV.

18. The computer-implemented method of claim 1, wherein the configuration of the components for the UAV is further based in part on weighting factors associated with the configuration that are different from other weighting factors associated with another configuration of the components of the UAV, the weighting factors configured to be updated by input provided by a user.

19. The computer-implemented method of claim 13, wherein the sound spectrum is associated with a particular user, the one or more acoustic models of the UAV are associated with the particular user, and the configuration of the components for the UAV is altered based on an altered acoustic model based in part on feedback from the particular user subsequent to a delivery of a payload.

* * * * *